United States Patent
Komatsubara (10) Patent No.: US 10,675,951 B2
(45) Date of Patent: Jun. 9, 2020

(54) HUMIDIFYING DEVICE

(71) Applicant: DENSO CORPORATION, Kariya, Aichi-pref. (JP)

(72) Inventor: Yusuke Komatsubara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 163 days.

(21) Appl. No.: 15/740,171

(22) PCT Filed: Jul. 12, 2016

(86) PCT No.: PCT/JP2016/070485
§ 371 (c)(1),
(2) Date: Dec. 27, 2017

(87) PCT Pub. No.: WO2017/018191
PCT Pub. Date: Feb. 2, 2017

(65) Prior Publication Data
US 2018/0312043 A1    Nov. 1, 2018

(30) Foreign Application Priority Data
Jul. 29, 2015  (JP) ................. 2015-150011

(51) Int. Cl.
*B60H 3/02* (2006.01)
*B60H 1/00* (2006.01)

(52) U.S. Cl.
CPC ... *B60H 3/022* (2013.01); *B60H 2001/00235* (2013.01); *B60H 2003/026* (2013.01); *B60H 2003/028* (2013.01)

(58) Field of Classification Search
CPC .... B60H 2001/00235; B60H 2003/026; B60H 2003/028; B60H 3/022
See application file for complete search history.

(56) References Cited

U.S. PATENT DOCUMENTS 5,509,275 A * 4/1996 Bhatti ................... B60H 3/024
165/7
5,873,256 A * 2/1999 Denniston .......... B60H 1/00414
62/244

(Continued)

FOREIGN PATENT DOCUMENTS

JP   H06143997 A    5/1994
JP   2008254638 A   10/2008

(Continued)

*Primary Examiner* — Henry T Crenshaw
(74) *Attorney, Agent, or Firm* — Harness, Dickey & Pierce, P.L.C.

(57) ABSTRACT

A humidifying device has an adsorption module and a blower. The adsorption module has the adsorbent. The adsorption module is configured to adsorb the water from the air passing through the adsorption module to the adsorbent and is configured to desorb the water from the adsorbent to air passing through the adsorption module. The blower blows the air to the adsorption module. The blower, in an adsorption operation in which the adsorbent adsorbs the water from air, draws the air from a roof space and blows the air to the adsorption module whereby the adsorption module adsorbs the water from the air. The roof space is defined between a vehicle ceiling panel and a ceiling interior member.

13 Claims, 6 Drawing Sheets

(56) References Cited

U.S. PATENT DOCUMENTS

| | | | | |
|---|---|---|---|---|
| 5,878,590 | A * | 3/1999 | Kadle | B60H 3/024 |
| | | | | 165/165 |
| 6,029,462 | A * | 2/2000 | Denniston | F24S 23/30 |
| | | | | 62/94 |
| 2009/0277195 | A1 * | 11/2009 | Viegas | B60H 3/024 |
| | | | | 62/115 |
| 2010/0022177 | A1 * | 1/2010 | Hidaka | B60H 1/00478 |
| | | | | 454/156 |
| 2010/0107673 | A1 * | 5/2010 | Nakaguro | B60H 3/024 |
| | | | | 62/271 |
| 2012/0144691 | A1 * | 6/2012 | Kohlrusch | D06F 58/24 |
| | | | | 34/473 |
| 2015/0136353 | A1 * | 5/2015 | Niemann | B60H 1/00207 |
| | | | | 165/41 |
| 2016/0054013 | A1 | 2/2016 | Komatsubara | |
| 2017/0136851 | A1 | 5/2017 | Komatsubara | |

FOREIGN PATENT DOCUMENTS

| | | | |
|---|---|---|---|
| JP | 2009280148 A | | 12/2009 |
| JP | 5083035 | * | 9/2012 |
| JP | 2014202426 A | | 10/2014 |
| JP | 2015101234 A | | 6/2015 |
| WO | WO-2016027429 A1 | | 2/2016 |

\* cited by examiner

HUMIDIFYING DEVICE

CROSS REFERENCE TO RELATED APPLICATIONS

This application is a U.S. National Phase Application under 35 U.S.C. 371 of International Application No. PCT/JP2016/070485 filed on Jul. 12, 2016 and published in Japanese as WO 2017/018191 A1 on Feb. 2, 2017. This application is based on and claims the benefit of priority from Japanese Patent Application No. 2015-150011 filed on Jul. 29, 2015. The entire disclosures of all of the above applications are incorporated herein by reference.

TECHNICAL FIELD

The present disclosure relates to a humidifying device that supplies a humidified air into a compartment.

BACKGROUND ART

Patent Literature 1 discloses an example of a humidifying device that supplies a humidified air to a passenger in a vehicle compartment. The humidifying device, when supplying a dehumidified air into the vehicle compartment, operates two blowers such that air from the vehicle compartment drawn into the two blowers through inlets of the two blowers and passes through two adsorption modules. The two adsorption modules adsorb water from the air while the air passes through the adsorption modules, whereby the air becomes the dehumidified air. The dehumidified air is guided from a first outlet to a second outlet by a switching dumper, then flowing from the first outlet toward a windshield and flowing from the second outlet toward the passenger.

The humidifying device, when supplying a humidified air into the vehicle compartment, operates one heater and the two blowers such that the air from the vehicle compartment is drawn into the two blowers and passes through the two adsorption modules. One adsorption module of the two adsorption modules includes water that is adsorbed to the one adsorption in advance in a manner that the one adsorption module is heated. The one adsorption module desorbs the water to the air passing through the one adsorption module. As a result, the air passing through the one adsorption module is humidified by the water desorbed from the one adsorption module and becomes the humidified air. The humidified air is guided to the second outlet by the switching dumper and flows from the second outlet toward the passenger. On the other hand, an other adsorption module of the two adsorption modules is not heated by a heater, whereby the other adsorption module adsorbs water from the air passing through the other adsorption module. As a result, the air becomes the dehumidified air. The dehumidified air is guided to the first outlet by the switching dumper and flows from the first outlet toward the windshield.

PRIOR ART LITERATURES

Patent Literature

Patent Literature 1: JP 2008-254638 A

SUMMARY OF INVENTION

In a winter situation that requires a humidification, a relative humidity of air inside the vehicle compartment decreases, i.e., the air is dried, because the vehicle compartment is heated. The humidifying device disclosed by Patent Literature 1 is a desiccant humidifying device that draws the air from the vehicle compartment, adsorbs water from the air, and uses the water to humidify the air. According to the desiccant humidifying device, a volume of the water, which is necessary to humidify the air, may not be adsorbed. That is, a humidifying performance of the desiccant humidifying device may not be secured sufficiently.

The present disclosure addresses the above-described issues, thus it is an objective of the present disclosure to provide a humidifying device that suppresses a deterioration of a humidifying performance while a heating air conditioning is performed to heat a vehicle compartment.

According to a first example of the present disclosure, a humidifying device is mounted to a vehicle and supplies a humidified air into a vehicle compartment. The humidifying device uses an adsorbent to adsorb water from air and humidifies air using the water to be the humidified air. The humidifying device has an adsorption module and a blower. The adsorption module has the adsorbent. The adsorption module is configured to adsorb the water from the air passing through the adsorption module to the adsorbent and is configured to desorb the water from the adsorbent to air passing through the adsorption module. The blower blows the air to the adsorption module.

The blower, in an adsorption operation in which the adsorbent adsorbs the water from air, draws the air from a roof space and blows the air to the adsorption module whereby the adsorption module adsorbs the water from the air. The roof space is defined between a vehicle ceiling panel and a ceiling interior member.

According to the first example, in the adsorption operation, the adsorbent adsorbs water from air in the roof space. The roof space is defined between the vehicle ceiling panel and the ceiling interior member that is located inside the vehicle compartment. As a result, water can be recovered from air that is less affected by a heating air conditioning as compared to an inside air inside the vehicle compartment of which relative humidity is decreased by the heating air conditioning. Therefore, water can be recovered with a high efficiency as compared to a case where water is recovered from water flowing from the vehicle compartment heated by the heating air conditioning. Accordingly, the humidified air, which is humidified sufficiently, can be supplied certainly in a desorption operation. Thus, the humidifying device can suppress a deterioration of a humidifying performance due to the heating air conditioning.

According to a second example of the present disclosure, a humidifying device is mounted to a vehicle and supplies a humidified air into a vehicle compartment. The humidifying device uses an adsorbent to adsorb water from air and humidifies air using the water to be the humidified air. The humidifying device has an adsorption module and a blower. The adsorption module has the adsorbent. The adsorption module is configured to adsorb the water from the air passing through the adsorption module to the adsorbent and is configured to desorb the water from the adsorbent to air passing through the adsorption module. The blower blows the air to the adsorption module.

The blower, in an adsorption operation in which the adsorbent adsorbs the water from air, draws air from an outside of the vehicle and blows the air to the adsorption module whereby the adsorbent adsorbs water from the air.

According to the second example, water is recovered from the air flowing from the outside of the vehicle in the adsorption operation. As a result, water can be recovered from air that is less affected by a heating air conditioning as compared to an inside air inside the vehicle compartment of which relative humidity is decreased by the heating air conditioning. Therefore, water can be recovered from the air flowing from the outside of the vehicle with a high efficiency as compared to a case where water is recovered from water flowing from the vehicle compartment heated by the heating air conditioning. Accordingly, the humidified air, which is humidified sufficiently, can be supplied certainly in a desorption operation. Thus, according to the second example, the humidifying device can suppress a deterioration of a humidifying performance due to the heating air conditioning.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments of the present disclosure will be described hereinafter referring to drawings. In the embodiments, a part that corresponds to or equivalents to a part described in a preceding embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
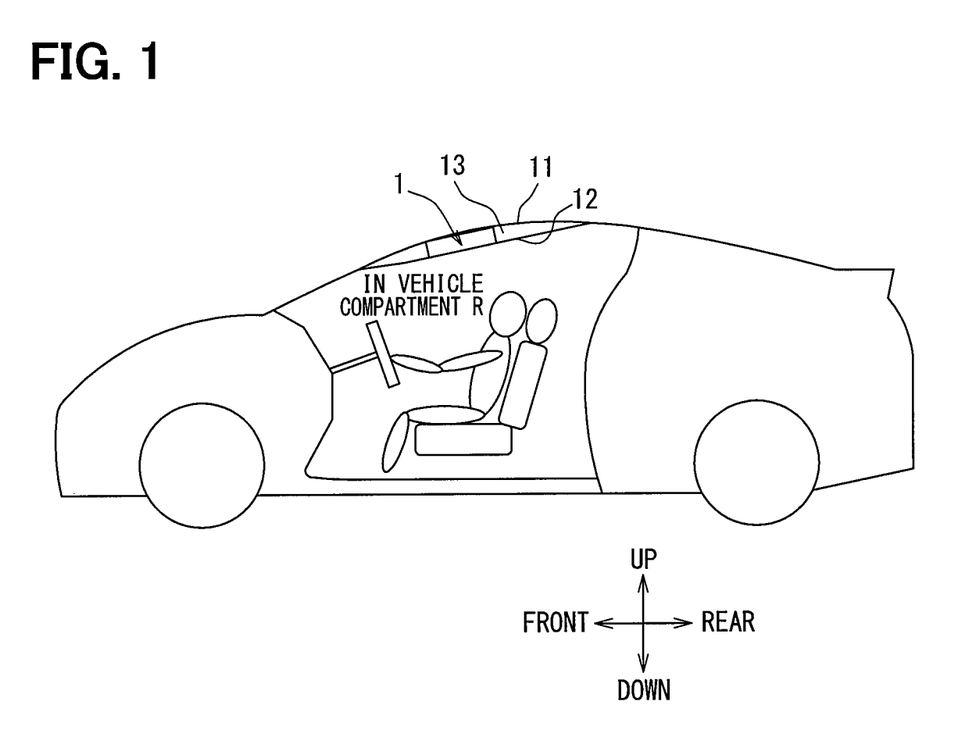
FIG. 1 is a schematic diagram explaining a position where a humidifying device is mounted to a vehicle relating to a first embodiment.

A humidifying device according to the present disclosure is arranged on a back side of a ceiling interior member 12. The ceiling interior member 12 is located inside a vehicle compartment R. The vehicle compartment R is a humidification target space. According to embodiments described below, for example, the humidifying device is mounted to the vehicle as shown in FIG. 1. Thus, the vehicle compartment R is the humidification target space of the humidifying device relating to the embodiments. The vehicle mounting a humidification device 1 has a vehicle air conditioner that adjusts a temperature in the vehicle compartment R.

Figure 2:
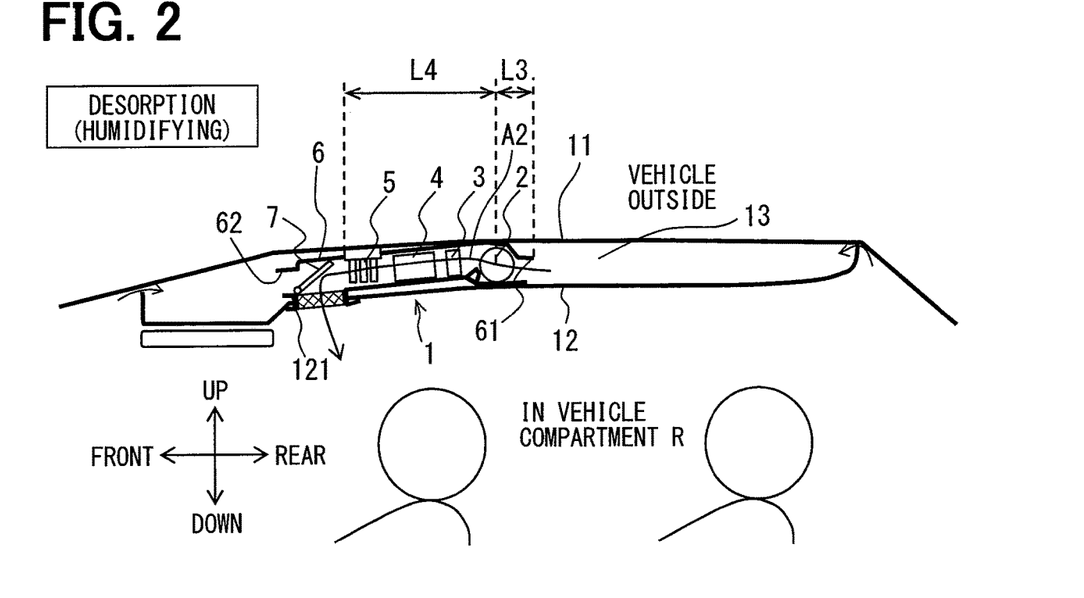
FIG. 2 is a cross-sectional view illustrating a schematic configuration of the humidifying device and a flow of air in a desorption operation relating to the first embodiment.
Figure 3:
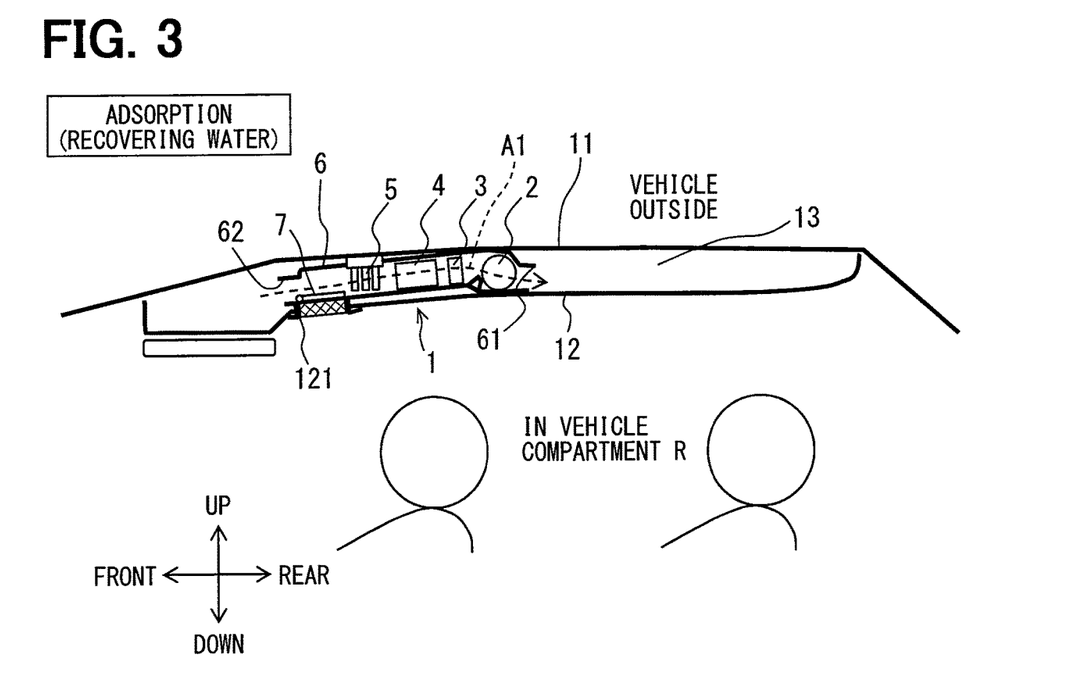
FIG. 3 is a cross-sectional view illustrating a schematic configuration of the humidifying device and a flow of air in an adsorption operation relating to the first embodiment.

As shown in FIG. 1, FIG. 2, and FIG. 3, the humidifying device 1 is located in a roof space 13 that is defined between a vehicle ceiling panel 11 and the ceiling interior member 12. The roof space 13 is partitioned from the vehicle compartment R by the ceiling interior member 12. The roof space 13 is defined between the vehicle ceiling panel 11 and the ceiling interior member 12, whereby a communication between the roof space 13 and the vehicle compartment is not shut out completely. An air may flow between the roof space 13 and the vehicle compartment R depending on a pressure difference between a pressure in the roof space 13 and a pressure in the vehicle compartment R.

Drawings include arrows indicating up, down, front, and rear. These directions are set on a condition that the humidifying device 1 is mounted to the vehicle. That is, an upper direction and a lower direction are an upper direction and a lower direction in an up-down direction of the vehicle, and a front direction and a rear direction are a front direction and a rear direction in a front-rear direction of the vehicle. The humidifying device 1 has a case 6 forming an exterior shape of the humidifying device 1. The case 6 houses a blower 2, a heater 3, an adsorption module 4, and a cooler 5.

As shown in FIG. 2, the blower 2, the heater 3, the adsorption module 4, and the cooler 5 are arranged in this order in a direction A2 in which air flows in a desorption operation. In the desorption operation, an adsorbent desorbs water. Therefore, in the desorption operation, air flows into the roof space 13 through a first opening 61, is heated in the heater 3, is humidified by passing through the adsorption module 4, is cooled in the cooler 5, and then flows from a vehicle interior blowing outlet into the vehicle compartment R. The vehicle interior blowing outlet will be referred to as a blowing outlet 121 hereafter. A flow of the air in the desorption operation is shown by a solid arrow in FIG. 2.

As shown in FIG. 3, the cooler 5, the adsorption module 4, the heater 3, and the blower 2 are arranged in this order in a direction A1 in which air flows in an adsorption operation. In the adsorption operation, the adsorption element adsorbs water from the air. Therefore, in the adsorption operation, air introduced into the roof space 13 from a second opening 62 is cooled in the cooler 5, is dehumidified in a manner that the air passes through the adsorption module 4 whereby an adsorbent adsorbs water from the air, is heated in the heater 3, and flows from the first opening 61 into the roof space 13. A flow of the air in the adsorption operation is shown by a dashed arrow in FIG. 3.

The first opening 61 is defined in a case 6 serving as a housing. The first opening 61 serves as a desorption inlet for a second opening) that draws air from the roof space 13 into the case 6 in the desorption operation. The first opening 61 also serves as an adsorption outlet for a third opening) that blows air (i.e., air after recovering water) into the roof space 13 after the adsorbent adsorbs water from the air. When the first opening 61 serves as the desorption inlet in the desorption operation, the blower 2 draws air into the roof space 13 and blows the air to the adsorption module 4. The second opening 62 is defined in the case 6. The second opening 62 serves as an adsorption inlet (or a first opening) that draws air from the roof space 13 into the case 6 in the desorption operation. The first opening 61 is defined in one end of the case 6, and the second opening 62 is defined in an other end of the case 6 facing the one end. For example, the first opening 61 is defined in a rear end of the case 6, and the second opening 62 is defined in a front end of the case 6 facing the rear end in the front-rear direction. In this case, the blower is located adjacent to the first opening 61 serving as the adsorption outlet.

The blowing outlet 121 is open downward to the vehicle compartment R and defines a passage that passes through both the case 6 and the ceiling interior member 12. For example, the blowing outlet 121 is defined to open toward a passenger having a front seat in the vehicle compartment R. A sun visor is mounted to the ceiling interior member 12 on a front side of the blowing outlet 121. The blowing outlet 121 preferably mounts a filter that collects a dust flowing with air.

A switching member such as a switching door 7 is located in the second opening 62 (i.e., the adsorption inlet). The switching door 7 is configured to guide air to flow into the roof space 13 in the desorption operation in which the adsorbent adsorbs water included in the air. The switching door 7 is configured to guide air to flow into the vehicle compartment R after the air passes through the adsorption module 4 in the desorption operation in which the adsorbent desorbs water to the air passing through the adsorbent. The second opening 62 is located adjacent to the blowing outlet 121 such that a communication between the second opening 62 and the blowing outlet 121 is shut out and open by the switching door 7.

Specifically, a controller controls the switching door 7 such that the switching door 7 closes the second opening 62 and opens the blowing outlet 121 in the desorption operation and that the switching door 7 closes the blowing outlet 121 and opens the second opening 62 in the adsorption operation. Thus, the switching door 7 is located on a front side of the cooler 5 in the case 6 and is attached to the front end of the case.

The blower 2 is located closest to the first opening 61 as compared to other devices, however a position of the blower 2 may be changed. That is, the blower 2 is located at any positions in an air passage between the first opening 61 and the second opening 62.

For example, the blower 2 is an electric blower that has an axial fan operated by an electric motor rotatably. The blower 2 configures a blowing device that blows air to pass the adsorption module 4. In this case, a controller switches rotational directions of the electric motor thereby reversing a flow direction of air blown by the blower 2. An operation capacity of the blower 2 is controlled depending on a control volume output from the controller. The operation capacity is, for example, a rotational speed of the blower 2 or a volume of the air blown by the blower 2.

For example, when the controller rotates the electric motor in a normal direction, the air flows as shown by the solid line in FIG. 2. The air in the roof space 13 is drawn from the first opening 61 into the air passage defined in the case 6, passes through the heater 3, the adsorption module 4, and the cooler 5 in this order, and then is blown from the blowing outlet 121 into the vehicle compartment R as a humidified air. In a humidification operation in which the humidified air is supplied to the vehicle compartment R, the air in the roof space 13 is drawn into the case 6 and then blown into the vehicle compartment R, whereby a pressure in the roof space 13 becomes slightly negative with respect to a pressure in the vehicle compartment R. As a result, some air in the vehicle compartment R is drawn into the roof space 13 through a void defined between the vehicle ceiling panel 11 and the ceiling interior member 12.

A volume of air blown into the vehicle compartment R per one period of the humidification operation is set to be smaller than a capacity of the roof space 13. For example, when the humidification operation is performed for one minute with 10 cubic meter of air per hour (10 m$^3$/h), the volume of the air blown into the vehicle compartment R per one period of the humidification operation is about 0.163 m$^3$. Then, the capacity of the roof space 13 is set to be larger than 0.163 m$^3$. Thus, the volume of the air blown into the vehicle compartment R per one period of the humidification operation becomes smaller than a volume of air in the roof space 13. As a result, it can be suppressed that a large volume of dried air is drawn from the vehicle compartment R into the humidification device. Therefore, the humidified air having a required relative humidity can be supplied into the vehicle compartment R.

The second opening 62 as the adsorption inlet is preferably distanced from a rim of the ceiling interior member 12 that may be in contact with the vehicle ceiling panel 11. For example, the second opening 62 is distanced from the rim of the ceiling interior member 12 such that a distance between the second opening 62 and the rim of the ceiling interior member 12 is larger than a distance between the second opening 62 and the first opening 61.

The rim of the ceiling interior member 12 and the vehicle ceiling panel 11 configure a joint that partitions the roof space 13. The first opening 61 is distanced from the rim of the ceiling interior member 12, not being located adjacent to the ceiling interior member 12, whereby the air drawn from the vehicle compartment R into the roof space 13 in the humidification operation can reach the vehicle ceiling panel 11. Here, for example, a temperature of the outside air is 0° C., a temperature of the air in the roof space 13 is 18° C., a relative humidity of the air in the roof space 13 is 30%, a temperature of air in the vehicle compartment R is 25° C., and a relative humidity of the air in the vehicle compartment R is 15% in winter. As shown in FIG. 2, the air drawn from the vehicle compartment R into the roof space 13 is cooled by being contact with the vehicle ceiling panel 11 in the humidification operation. As a result, the relative humidity of air can be increased before the air reaches the adsorption module 4, whereby a relative humidity of the humidified air can be increased. This effect is exerted drastically in winter where the temperature of the outside air is low.

On the other hand, when the controller reverses the rotational direction of the electric motor, the air flows as the dashed arrow in FIG. 3. Air in the roof space 13 drawn from the second opening 62 into the air passage defined in the case 6, passes through the cooler 5, the adsorption module 4, and the heater 3 in this order, and then is blown into the roof space 13 from the first opening 61 as a dehumidified air. In the desorption operation, the air in the roof space 13 is drawn into the case 6 and blown into the roof space 13 after recovering water, whereby a pressure in the roof space 13 does not become negative with respect to a pressure in the vehicle compartment R. Therefore, air is not drawn from the vehicle compartment R into the roof space 13 through the void defined between the vehicle ceiling panel 11 and the ceiling interior member 12.

The case 6 is made of resin or metal to have a box shape and defines the air passage therein. Air, which is blown by the blower 2, flows through the air passage. For example, the case 6 has a thin rectangular parallelepiped shape extending along the vehicle ceiling panel 11 and the ceiling interior member 12.

The adsorption module 4 is configured by metal plate members that support adsorbents and are stacked to be distance from each other. A passage through which air passes is defined between adjacent two plate members of the plate members. According to the present embodiment, a contact area where air and the adsorbents are in contact with each other is increased by stacking the plate members supporting the adsorbents. For example, the adsorbents may be made of polymer or a hygroscopic material such as xerolite. Xerolite is generated when gelatinous ooze is dried and becomes polyhedron particles.

The heater 3 is configured to heat air passing through the air passage defined in the case 6. A configuration of the heater 3 is not limited as long as being configured to heat the air. For example, the heater 3 has a heat generator that generates heat when electric power is supplied to the heat generator. Alternatively, the heater 3 may heat the air, which flows from the vehicle compartment R into the heater 3, by performing a heat exchange between the air and a medium having a higher temperature than the air. For example, the heater 3 is a nichrome wire heater, a device having a PTC (Positive Temperature Coefficient) heater, or a heat exchanger. The medium having a higher temperature than the air may be warm water, refrigerant, engine cooling water, or a heat generator such as an electronic member that generates heat in the vehicle.

The cooler 5 is configured to cool the air passing through the air passage defined in the case 6. A configuration of the cooler 5 is not limited as long as being configured to cool the air. For example, the cooler 5 is a heatsink that is configured to exchange heat with the vehicle ceiling panel 11. More specifically, the cooler 5 may be a device having a Peltier element that adsorbs heat when electric power is supplied to the Peltier element. Alternatively, the cooler 5 may be a device that is configured to cool air, which flows from the vehicle compartment R to the cooler 5, by exchanging heat with the air and a medium having a lower temperature than the air. The cooler 5 may be a heat exchanger in which a low-temperature medium flows. The low-temperature medium having a lower temperature than the air may be the outside air, a conditioned air, or a refrigerant circulating in a refrigeration cycle configuring the air conditioner.

For example, the heat exchanger using the outside air as the low-temperature medium is the heatsink. The heatsink is made of metal such as aluminum and copper having a great thermal conductivity. The heatsink is a heat transferring member that has fins made of metal. The heatsink is attached to the vehicle ceiling panel 11. The heatsink transfers heat of the outside air, which flows into the heatsink from the outside of the vehicle, to the air passage defined in the case 6. That is, the heatsink is configured to perform a heat exchange between the outside air and air flowing in the air passage defined in the case 6. For example, the heatsink is a cooler that cools air, which is blown into the vehicle compartment R, by transferring a cold heat of the outside air to the air. Alternatively, the heatsink may be a cooler that cools air by dissipating heat of the air to the outside air.

The controller is configured by a microcomputer including CPU, ROM, and RAM and a peripheral circuit. The controller controls operations of the blower 2 and the switching door 7 that are connected to an output side of the controller. The controller may control a heating performance of the heater 3 and a cooling performance of the cooler 5.

An inside air sensor and an outside air sensor are connected to an input side of the controller. The inside air sensor serves as an inside air temperature detector that detects a temperature of air in the vehicle compartment R. The outside air sensor serves as an outside air temperature sensor that detects a temperature of the outside air. Detection signals from those sensors are input to the controller. An operation switch that operates the humidifying device 1 is also connected to the input side of the controller, and an operation signal from the operation switch is input to the controller.

The controller may be combined with an air conditioning controller that controls operations of devices configuring a vehicle air conditioner. Alternatively, the controller may be provided separately from the air conditioning controller and may share information regarding a control state of a control target device with the air conditioning controller.

An operation of the humidifying device 1 will be described hereafter. The operation of the humidifying device 1 starts when the operation switch is operated by a passenger to be turned ON, for example, while the vehicle air conditioner performs an air conditioning in the vehicle compartment R.

For example, the humidifying device 1 is operated when a temperature of the outside air is low as in winter and air in the vehicle compartment R is dried easily. When the operation switch is turned ON, the controller switches between a state where the electric motor of the blower 2 rotates in the normal direction and the switching door 7 opens the blowing outlet 121 and a state where the electric motor rotates in a reversed direction and the switching door 7 opens the second opening 62. That is, the controller switches between a ventilation path in which air flows as shown by the solid arrow in FIG. 2 in the desorption operation and a ventilation path in which air flows as shown by the dashed arrow in FIG. 3 in the adsorption operation at specified time intervals.

In the desorption operation, the controller rotates the electric motor of the blower 2 in the normal direction and operates the switching door 7 to open the blowing outlet 121. As a result, air in the roof space 13, a temperature of which is 18° C. and a relative humidity of which is 30%, is drawn into the case 6 through the first opening 61. The air, which is drawn into the air passage defined in the case 6, is heated while passing through the heater 3. At this time, the controller operates the heater 3 with a fixed output power or operates the heater 3 with various output power depending on a temperature change of the air such that a temperature of the air after passing through the heater 3 becomes a specified temperature, e.g., 5° C., higher than a temperature of air in the roof space 13. That is, the temperature of the air after passing through the heater 3 becomes about 23° C.

The air, which flows out of the heater 3, flows into the adsorption module 4. Here, a relative humidity of the air, a temperature of which raises by passing through the heater 3, is lower than the relative humidity of the air in the roof space 13. Therefore, the air, of which relative humidity is decreased by passing through the heater 3, comes in contact with the adsorbents of the adsorption module 4, whereby water adsorbed to the adsorbents are desorbed to the air easily. That is, the air, of which relative humidity is decreased by the heater 3, adsorbs water from the adsorbents easily, thereby being the humidified air, which is humidified sufficiently, when flowing out of the adsorption module 4.

The humidified air is then cooled by the cooler 5, whereby a temperature of the humidified air, which has been increased by the heater 3, falls. Accordingly, the humidified air can be blown toward the passenger from the blowing outlet 121 while having a cool temperature. Thus, the humidifying device 1 can humidify air by the heater 3 to be the humidified air and supply the humidified air to the passenger after cooling the humidified air by the cooler in the desorption operation. As a result, a comfortable feeling of the passenger can be improved.

In the desorption operation, since the air is heated by the heater 3 before the air flows into the adsorption module 4, a temperature of the air can be increased promptly. By increasing the temperature of the air promptly, a relative humidity of the air can be decreased promptly. As a result, the adsorption module 4 desorbs water actively, whereby a relative humidity of air flowing out of the adsorption module 4 can be increased promptly.

In the adsorption operation, the controller reverses the rotational direction of the electric motor of the blower 2 and operates the switching door 7 to open the second opening 62. As a result, the air, the temperature of which is 18° C. and the relative humidity of which is 30%, is drawn from the roof space 13 into the case 6 through the second opening 62. The air, which is drawn into the air passage defined in the case 6, is cooled while passing through the cooler 5.

The air flows into the adsorption module 4 after passing through the cooler 5. Here, a relative humidity of the air, a temperature of which is decreased by passing though the cooler 5, is higher than the relative humidity of the air in the roof space 13. Accordingly, the air, the relative humidity of which is higher than the relative humidity of the air in the roof space 13, can come in contact with the adsorbents, whereby the adsorbents can adsorb water from the air easily. That is, the air, the relative humidity of which has been increased by the cooler 5, desorbs water to the adsorbents easily, whereby air flowing out of the adsorption module 4 becomes the dehumidified air that is dehumidified sufficiently. Subsequently, the air flowing out of the adsorption module 4 is heated while passing through the heater 3, and then is blown from the first opening 61 into the roof space 13.

In the adsorption operation, since air is cooled by the cooler 5 before the air flows into the adsorption module 4, a temperature of the air can be decreased promptly. In addition, since the temperature of the air is decreased promptly, a relative humidity of the air can be increased promptly. As a result, the adsorption module 4 can adsorb water actively, whereby a relative humidity of air flowing out of the adsorption module 4 can be decreased promptly.

Figure 4:
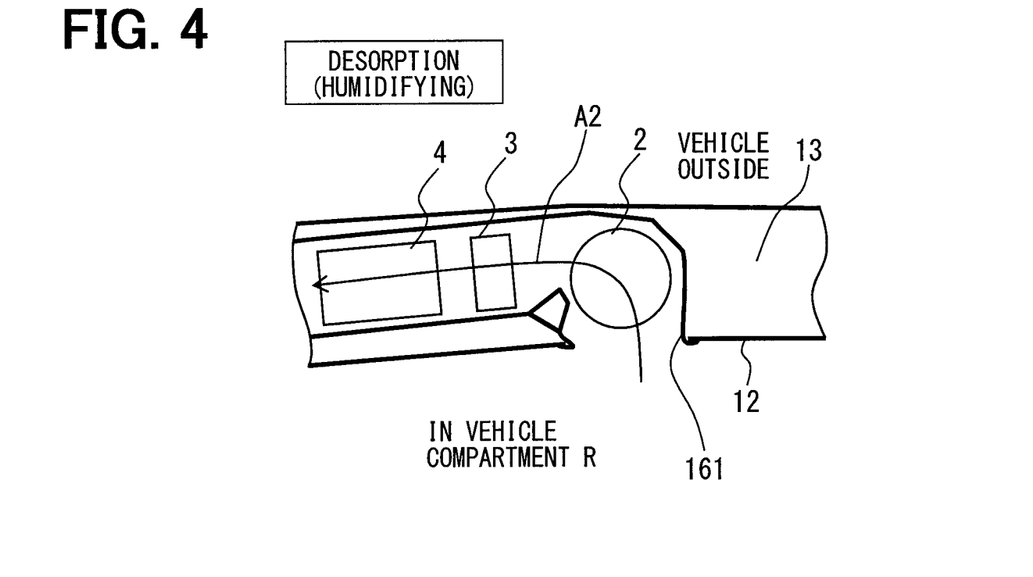
FIG. 4 is a cross-sectional view illustrating a part of a humidifying device that draws air from a vehicle compartment in a desorption operation relating to a modification of the first embodiment.

As a modification, the humidifying device 1 may be configured to draw air from the vehicle compartment R when drawing air into the case 6 in the desorption operation. In this case, as shown in FIG. 4, a first opening 161 is defined adjacent to the blower 2 in the case 6 so as to open toward the vehicle compartment R and so as to define a passage through which an inside of the case 6 and an inside of the vehicle compartment R communicate with each other.

As a modification, the humidifying device 1 may be configured to emit air into the vehicle compartment R after recovering water in the adsorption operation.

Figure 5:
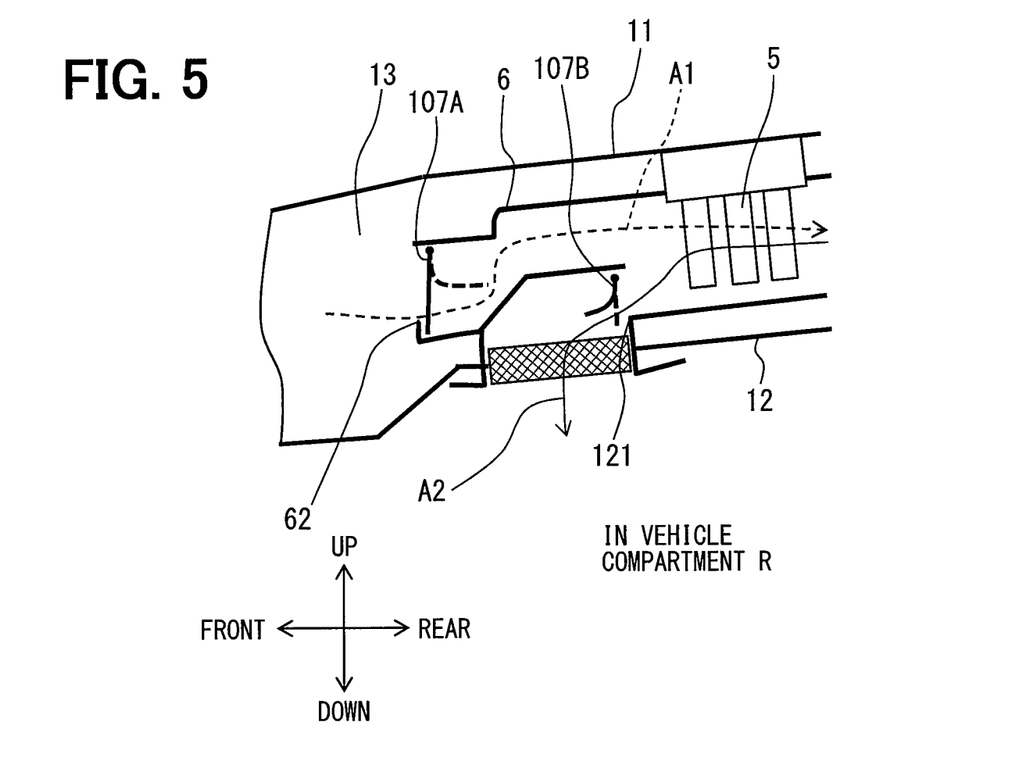
FIG. 5 is a cross-sectional view illustrating a part of a humidifying device having a check valve relating to a modification of the first embodiment.

As a modification, the humidifying device 1 may have a check valve 107A and a check valve 107B serving as a switching member instead of the switching door 7. In this case, as shown in FIG. 5, the check valve 107A is located in the second opening 62 such that the check valve 107A permits air to flow from the roof space 13 into the case 6 and blocks a flow of air flowing from the case 6 to the roof space 13. For example, the check valve 107A permits the air to flow in the direction A1 by deforming elastically as shown by a dashed line in FIG. 5 in the adsorption operation, and blocks the flow of the air flowing from the case 6 to the roof space 13 by sealing the second opening 62 as shown by a solid line in FIG. 5 in the desorption operation.

On the other hand, as shown in FIG. 5, the check valve 107B is located in the blowing outlet 121 such that the check valve 107B permits air to flow from the case 6 to the vehicle compartment R and blocks a flow of air flowing from the vehicle compartment R into the case 6. For example, the check valve 107B permits the air to flow in the direction A2 by deforming elastically as shown by a solid line in FIG. 5 in the desorption operation, and blocks the flow of the air flowing from the case 6 to the roof space 13 by sealing the blowing outlet 121 as shown by a dashed line in FIG. 5 in the adsorption operation.

The humidifying device 1 provides the following effects according to the first embodiment. The humidifying device 1 is mounted to the vehicle. The humidifying device 1 adsorbs water from air using the adsorbents and supplies the humidified air, which is humidified with the water desorbed from the adsorbents, into the vehicle compartment R. The humidifying device 1 has the adsorption module 4 and the blower 2. The adsorption module 4 has the adsorbents. The adsorption module 4 is configured to adsorb the water from the air passing through the adsorption module 4 to the adsorbents and is configured to desorb the water from the adsorbents to air passing through the adsorption module 4. The blower 2 blows air to the adsorption module 4. The blower 2, in the adsorption operation, draws air from the roof space 13 and blows the air to the adsorption module 4 whereby the adsorption module 4 adsorbs the water from the air. The roof space 13 is defined between the vehicle ceiling panel 11 and a ceiling interior member 12.

According to the above-described structure, the adsorbents adsorb water from air flowing from the roof space 13 in the adsorption operation. That is, the adsorbents can adsorb water from air that is less affected by the heating air conditioning as compared to air in the vehicle compartment R of which relative humidity is decreased by the heating air conditioning. As a result, the adsorbents can adsorb water from air more effectively as compared to a case where the adsorbents adsorb water from heated air that is heated in the vehicle compartment R by the heating air conditioning. Therefore, the adsorbents can desorb a humidified air and perform the humidification certainly in the desorption operation. Thus, the humidification device 1 can suppress a deterioration of a humidifying performance due to the heating air conditioning.

The case 6 of the humidifying device 1 is located in the roof space 13. The blower 2 draws air from the roof space 13 through the adsorption inlet defined in the case 6 and blows the air to the adsorption module 4 in the adsorption operation. That is, the case 6, which houses functional components of the humidifying device 1, is housed in the roof space 13, and has the adsorption inlet. Accordingly, the humidifying device 1 is not located in the vehicle compartment R, thereby being mounted compactly.

The blower 2, in the adsorption operation, draws air from the roof space 13 and blows the air into the roof space 13 after the adsorbents adsorb water from the air. The blower 2, in the desorption operation, draws air from the roof space 13 and blows the air to the adsorption module 4.

According to the above-described structure, the blower 2 draws the air from the roof space 13 and blows the air into the roof space 13 after the adsorbents adsorb water from the water, whereby a pressure in the roof space 13 does not become negative. Accordingly, air can be prevented from flowing from the vehicle compartment R into the roof space 13. That is, dried air does not flow from the vehicle compartment R into the roof space 13, whereby a relative humidity of the air in the roof space 13 can be prevented from decreasing. In the desorption operation, the dried air is drawn from the vehicle compartment R by drawing air from the roof space 13, whereby a relative humidity of the humidified air can be increased.

The first opening 61 serves as the adsorption outlet that emits air into the roof space 13 after the adsorbents adsorb water from the air in the adsorption operation.

The adsorption outlet is defined at one end of the humidifying device 1, and the blowing outlet 121, which blows the humidified air into the vehicle compartment R in the desorption operation, is defined at an other end of the humidifying device 1 facing the one end. In other words, the humidifying device 1 is located between the first opening 61 and the blowing outlet 121. The blower is located adjacent to the adsorption outlet. Specifically, a distance L3 between the blower 2 and the first opening 61 (i.e., the adsorption outlet) is shorter than a distance L4 between the blower 2 and the blowing outlet 121. That is, the adsorption outlet located adjacent to the blower 2 is distanced from the blowing outlet 121. As a result, noise caused by the blower 2 can be prevented from transmitting into the vehicle compartment R. Thus, the humidifying device 1 can suppress noise.

The cooler 5 is a heat exchanger that is configured to cool air flowing in the case 6 by performing a heat exchange between the air and the outside air. Accordingly, when the outside air has a low temperature and functions as a cooling heat medium in winter, power to cool the air is not necessary, whereby the cooler 5 can cool the air with small energy and small cost.

Second Embodiment

Figure 6:
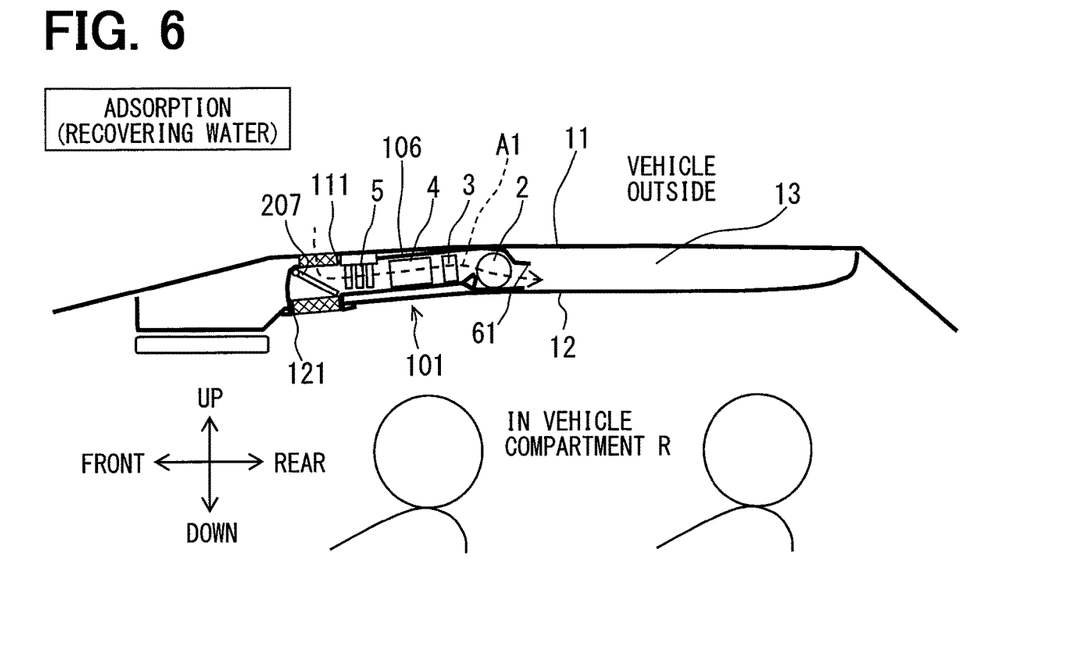
FIG. 6 is a cross-sectional view illustrating a schematic configuration of a humidifying device and a flow of air in an adsorption operation relating to a second embodiment.

A second embodiment will be described referring to FIG. 6. When a configuration or a component is assigned with the same numeral as that illustrated in the drawings relating to the first embodiment and an explanation thereof is omitted in the second embodiment, it means that the configuration or the component is similar to the first embodiment and provides the same effects and operations as the first embodiment. Thus, differences between the first embodiment and the second embodiment will be described hereafter.

A humidifying device 101 of the second embodiment is different from the first embodiment in a point that the humidifying device 101 draws the outside air from an outside of the vehicle, not the air in the roof space 13, into the case 6 in the adsorption operation. As shown in FIG. 6, the humidifying device 101 has a second opening 111 that communicates with the outside of the vehicle. The second opening 111 defines a passage that passes through both the case 6 and the vehicle ceiling panel 11. The second opening 111, in the adsorption operation, serves as the adsorption inlet that draws the outside air from the outside of the vehicle into the case 6. The second opening 111 preferably has a filter that collects dusts flowing with the air. In the adsorption operation, the outside air flowing from the second opening 111 is cooled in the cooler 5, desorbs water to the adsorbents while passing through the adsorption module 4, is heated in the heater 3, and then is blown from the first opening 61 into the roof space 13. A flow of the air in the adsorption operation is shown by a dashed arrow in FIG. 6.

The second opening 111 is located to face the blowing outlet 121 in the up-down direction. A switching door 207 opens and closes the second opening 111 and the blowing outlet 121. The switching door 207 is a switching member. The controller operates the switching door 207 such that the switching door 207 closes the second opening 111 and opens the blowing outlet 121 in the desorption operation, and that the switching door 207 closes the blowing outlet 121 and opens the second opening 111 in the adsorption operation. Therefore, the switching door 207 is located on a front side of the cooler 5 in the case 6 and attached to the front end of the case 6.

According to the humidifying device 101 of the second embodiment, the blower 2, in the adsorption operation, draws the outside air and blows the outside air to the adsorption module 4 whereby the adsorbents adsorb water from the outside air. Accordingly, the adsorbents adsorb water from the outside air in the adsorption operation. That is, the adsorbents can adsorb water from air that is less affected by the heating air conditioning as compared to a case where the adsorbents adsorb water from air that is drawn from the vehicle compartment R after a relative humidity of which is decreased by the heating air conditioning. As a result, the adsorbents can adsorb water from the outside air effectively as compared to the case where the adsorbents adsorb water from heated air that is heated in the vehicle compartment R by the heating air conditioning. Therefore, the adsorbents can desorb a humidified air and perform the humidification operation certainly in the desorption operation. Thus, according to the second embodiment, the humidifying device 101 can suppress a deterioration of the humidifying performance due to the heating air conditioning.

Third Embodiment

A third embodiment will be described referring to FIG. 7 and FIG. 8. When a configuration or a component is assigned with the same numeral as that illustrated in the drawings relating to the first embodiment and an explanation thereof is omitted in the third embodiment, it means that the configuration or the component is similar to the first embodiment and provides the same effects and operations as the first embodiment. Thus, differences between the first embodiment and the third embodiment will be described hereafter.

The third embodiment is different from the first embodiment in a point that the ceiling interior member 12 has a communication opening 122 through which the roof space 13 and the vehicle compartment R communicate with each other. The communication opening 122 passes through the ceiling interior member 12 and is open downward to the vehicle compartment R. The communication opening 122 defines a path that connects the roof space 13 and the vehicle compartment R to each other. For example, the communication opening 122 is open on an upper side of a rear seat of the vehicle for a passenger in the vehicle compartment R. The communication opening 122 preferably has a filter that collects dusts flowing with air.

The communication opening 122 is located closer to the first opening 61 serving as the adsorption outlet (i.e., the desorption inlet) than the second opening 62 serving as the adsorption inlet. In other words, a distance L1 between the communication opening 122 and the first opening 61 is shorter than a distance L2 between the communication opening 122 and the second opening 62. That is, the first opening 61 is located between the second opening 62 and the communication opening 122 in the front-rear direction. The communication opening 122 is located closer to the rear seat than the front seat, and the roof space 13 and the vehicle compartment R communicate with each other through the communication opening 122. The communication opening 122 is located on one side of the roof space 13 that faces an other side of the roof space 13 where the case 6 is located.

Figure 7:
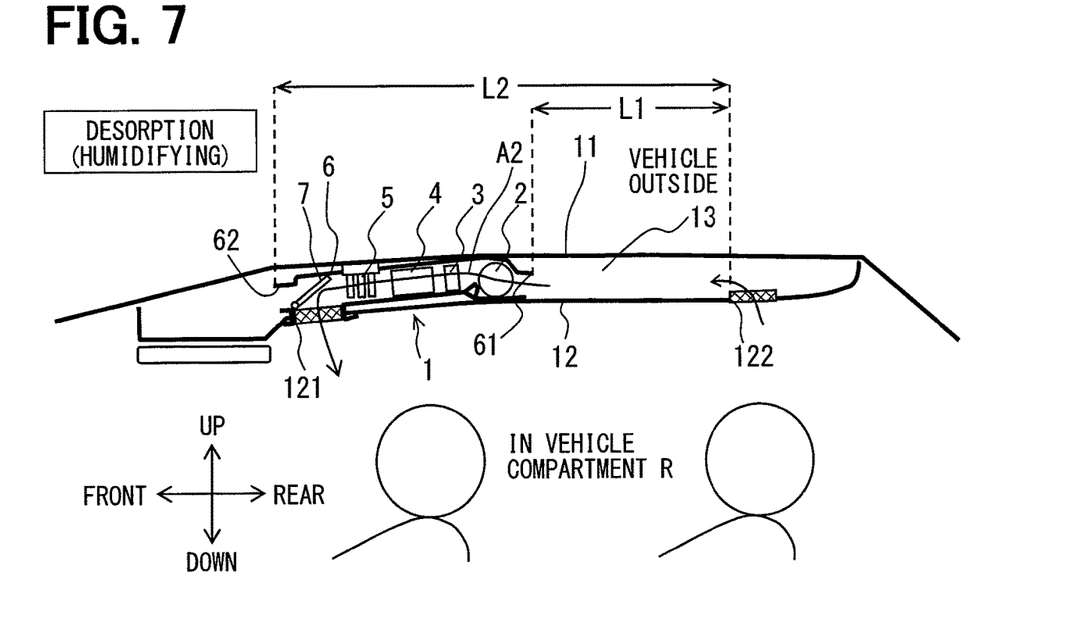
FIG. 7 is a cross-sectional view illustrating a schematic configuration of the humidifying device and a flow of air in a desorption operation relating to a third embodiment.

As shown in FIG. 7, the humidifying device 1, in the desorption operation, introduces air from the first opening 61 into the roof space 13, heats the air by the heater 3, humidifies the air by the adsorption module 4, cools the air by the cooler 5, and then blows the air from the blowing outlet 121 into the vehicle compartment R. At this time, the air in the roof space 13 flows in the direction A2 as shown by a solid arrow in FIG. 7, whereby a pressure in the roof space 13 becomes slightly negative as compared to a pressure in the vehicle compartment R. As a result, air in the vehicle compartment R is drawn into the roof space 13 through the communication opening 122. That is, a volume of air, which is drawn from the vehicle compartment R into the roof space 13 through the communication opening 122, becomes substantially the same as a volume of the humidified air, which is supplied into the vehicle compartment R through the blowing outlet 121 in the humidifying operation.

Figure 8:
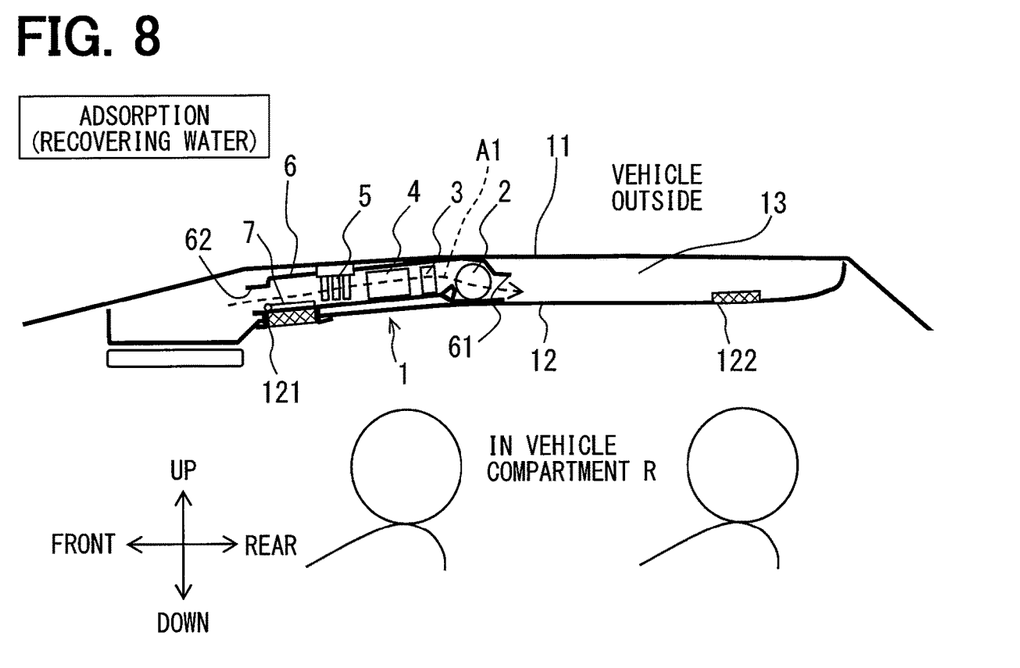
FIG. 8 is a cross-sectional view illustrating a schematic configuration of a humidifying device and a flow of air in an adsorption operation relating to the third embodiment.

As shown in FIG. 8, in the adsorption operation, the humidifying device 1 draws air from the roof space 13 into the case 6, adsorbs water from the air, and then blows the air into the roof space 13, whereby the pressure in the roof space 13 does not become negative as compared to the pressure in the vehicle compartment R. That is, air is not drawn from the vehicle compartment R into the roof space 13 through the communication opening 122.

According to the third embodiment, the communication opening 122, through which the roof space 13 and the vehicle compartment R communicate with each other, is located closer to the desorption inlet than the adsorption inlet. As a result, air in the vehicle compartment R can be drawn into the roof space 13 through the communication opening 122 positively. Thus, a route through which the air flows from the vehicle compartment R into the roof space 13 can be limited, whereby a temperature and humidity around the humidifying device 1 in the roof space 13 can be stable.

In addition, the communication opening 122 is located on a side opposite to a side where the case 6 is located inside the roof space 13, whereby the route through which air flows from the vehicle compartment R into the roof space 13 can be located away from the humidifying device 1. Accordingly, the temperature and the humidity around the humidifying device 1 inside the roof space 13 can be more stable.

Fourth Embodiment

A fourth embodiment will be described hereafter referring to FIG. 9. When a configuration or a component is assigned with the same numeral as that illustrated in the drawings relating to the third embodiment and an explanation thereof is omitted in the present embodiment, it means that the configuration or the component is similar to the third embodiment and provides the same effects and operations as the third embodiment. Thus, differences between the third embodiment and the fourth embodiment will be described hereafter.

Figure 9:
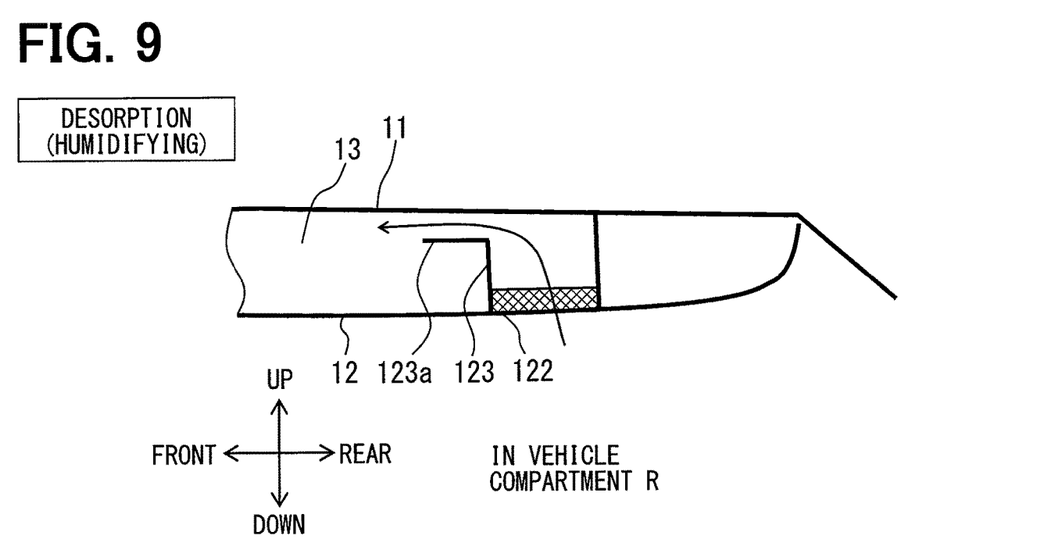
FIG. 9 is a cross-sectional view illustrating a part of a humidifying device having a wind guide portion relating to a fourth embodiment.

As shown in FIG. 9, a humidifying device of the fourth embodiment has a tubular member 123. The tubular member 123 is located between the communication opening 122 and the vehicle ceiling panel 11 in the roof space 13 and is distanced from the vehicle ceiling panel 11. In other words, the tubular member 123 extends from the communication opening 122 toward the vehicle ceiling panel 11, and a void is defined between the tubular member 123 and the vehicle ceiling panel 11. The tubular member 123 has a wind guide portion 123a on a downstream side of the communication opening 122 in a flow direction of air inside the roof space 13. The wind guide portion 123a is extends from the tubular member 123 toward the case 6 on a side of the tubular member 123 adjacent to the vehicle ceiling panel 11. Specifically, the tubular member 123 has an end adjacent to the vehicle ceiling panel 11, and the wind guide portion 123a extends from the end of the tubular member 123 toward the case 6. The wind guide portion 123a guides air, which is drawn from the vehicle compartment R into the roof space 13 through the communication opening 122 in the desorption operation, to flow along the vehicle ceiling panel 11.

The wind guide portion 123a is, i.e., a plate member, that extends along an inner surface of the vehicle ceiling panel 11. As shown by a solid arrow in FIG. 9, the wind guide portion 123a guides the air, which flows upward from the communication opening 122 into the roof space 13, to flow along the vehicle ceiling panel 11 toward the first opening 61.

According to the humidifying device of the fourth embodiment, the wind guide portion 123a guides the air, which flows from the vehicle compartment R into the roof space 13, to flow along the vehicle ceiling panel 11 toward the first opening 61. A temperature of the vehicle ceiling panel 11 is lower than a temperature of air in the vehicle compartment R that is heated during the heating air conditioning. As a result, the air flowing from the vehicle compartment R into the roof space 13 can be cooled effectively, whereby the humidifying device can recover water more effectively.

Fifth Embodiment

A fifth embodiment will be described hereafter referring to FIG. 10. When a configuration or a component is assigned with the same numeral as that illustrated in the drawings relating to the first and second embodiments and an explanation thereof is omitted in the present embodiment, it means that the configuration or the component is similar to the first and second embodiments and provides the same effects and operations as the first and second embodiments. Thus, differences between the first embodiment and the fifth embodiment will be described hereafter.

The fifth embodiment is different from the first embodiment in a point that the humidifying device 201 is not located in the roof space 13 and is mounted to a lower surface of the ceiling interior member 12. The ceiling interior member 12 is located above the passenger and partitions the roof space 13.

Figure 10:
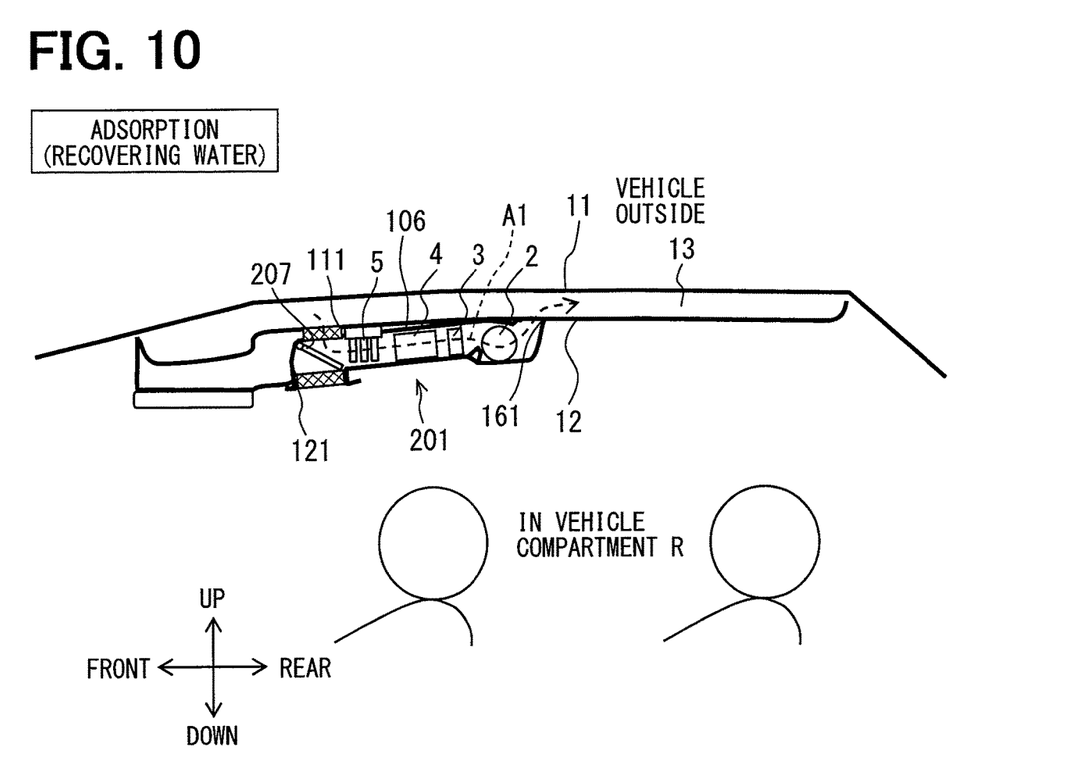
FIG. 10 is a cross-sectional view illustrating a schematic configuration of a humidifying device and a flow of air in an adsorption operation relating to a fifth embodiment.

As shown in FIG. 10, the humidifying device 201 has a second opening 111 through which an inside of the humidifying device 201 and an inside of the roof space 13 communicate with each other. The second opening 111 defines a passage that passes through a case 106 and the ceiling interior member 12. The second opening 111 serves as an adsorption inlet, which draws air from the roof space 13 into the case 106 in the adsorption operation. The second opening 111 preferably has a filter that collects dust flowing with the air. The case 106 has a first opening 161 that is located adjacent to the blower 2. The first opening 161 defines a passage that passes through the case 106 and the ceiling interior member 12. The first opening 161 serves as an adsorption outlet that emits air into the roof space 13 after water is recovered from the air.

In the adsorption operation, air is introduced from the second opening 111 into the roof space 13, is cooled in the cooler 5, desorbs water to the adsorbents while passing through the adsorption module 4, is heated in the heater 3, and then is blown from the first opening 161 into the roof space 13. This flow of the air is shown by a dashed arrow in FIG. 10.

Modifications

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The scope of the present disclosure includes all modifications that are equivalent to descriptions of the present disclosure or that are made within the scope of the present disclosure.

According to the above-described embodiments, the blower 2, the heater 3, the adsorption module 4, and the cooler 5 are arranged to be distanced from each other. However, at least two of the blower 2, the heater 3, the adsorption module 4, and the cooler 5 may be combined to exert more than one function.

The heater 3, the adsorption module 4, and the cooler 5 are not limited to be arranged in the above-described order in the dehumidifying device 1. For example, two air passages may be defined to be arranged in the up-down direction in the humidifying device 1, and at least one of the heater 3, the adsorption module 4, and the cooler 5 is arranged in one of the two air passages and the rest of them are arranged in the other of the two air passages. For example, an air passage used in the adsorption operation and an air passage used in the desorption operation may be defined to be arranged in the up-down direction in the humidifying device 1, and various devices are located in the air passages as required.

According to the above-described embodiments, the adsorption module 4 is configured by the metal plate members that support adsorbents and are stacked to be distanced from each other. However, the adsorption module 4 may have different configurations. For example, the adsorption module 4 may be configured by corrugated plates that support the adsorbents and are stacked to be distanced from each other. Alternatively, the adsorption module 4 may be configured by a honeycomb member that therein has passages having a hexagonal shape in cross section and supporting the adsorbents.

According to the above-described first embodiment, the controller switches a rotational direction of the electric motor of the blower 2 between the normal direction and the reversed direction thereby switching directions in which the blower 2 blows air. However, the directions in which the blower 2 blows air may be switched in different ways.

According to the above-described embodiments, the directions in which the blower 2 blows air are switched by reversing the rotational directions of the fan of the blower 2. However, the directions in which the blower 2 blows air may be switched in different ways. For example, the blower 2 may have a guide member of which rotational positions varies. In this case, the blower 2 may have a wind direction changing function that switches a flow direction of air being guided by the guide member between a direction A1 and a direction A2 opposing to each other.

According to the above-described embodiments, the blowing outlet 121 is located on a side where the front seat is located and the communication opening 122 is located on a side where the rear seat is located, whereby the humidified air is supplied toward the front seat. However, positions of the blowing outlet 121 and the communication opening 122 are not limited to the above-described example.

According to the above-described embodiments, the blowing outlet 121 is open toward an upper body of the passenger having the front seat. However, the blowing outlet 121 is not limited to have the above-described configuration.

The humidifying device 101 regarding the second embodiment may have the communication opening 122 described in the third embodiment. In addition, the humidifying device 201 regarding the fifth embodiment may have the communication opening 122 described in the third embodiment.

The invention claimed is:

1. A humidifying device for a vehicle for adsorbing water from air and supplying a humidified air into a vehicle compartment, the humidifying device comprising:
    an adsorption module that holds an adsorbent, the adsorbent adsorbing the water from the air passing through the adsorption module and desorbing the water to air passing through the adsorption module;
    a blower; and
    a case that houses the adsorption module and the blower and is located in a roof space, wherein
    the blower, in an adsorption operation in which the adsorbent adsorbs the water from air, is configured to
        draw the air from the roof space into the case through a first opening defined in the case, the roof space being defined between a vehicle ceiling panel and a ceiling interior member of the vehicle, the ceiling interior member being located inside the vehicle compartment, and
        blow the air to the adsorption module whereby the adsorption module adsorbs the water from the air,
    the blower, in a desorption operation in which the adsorbent desorbs the water to the air passing through the adsorption module, is configured to draw the air from the roof space and blow the air to the adsorption module,
    the ceiling interior member has a communication opening through which the roof space and the vehicle compartment communicate with each other,
    the case has a second opening through which the air flows from the roof space into the case in the desorption operation, and
    the second opening is located between the first opening and the communication opening.

2. The humidifying device according to claim 1, wherein
    the blower, in the adsorption operation, is configured to draw the air from the roof space and blow the air after the adsorbent adsorbs water from the air, and
    the blower, in a desorption operation in which the adsorbent desorbs the water to the air passing through the adsorption module, is configured to draw the air from the roof space and blow the air to the adsorption module.

3. The humidifying device according to claim 1, wherein the case is located adjacent to one end of the roof space, and the communication opening is located adjacent to an other end of the roof space facing the one end.

4. The humidifying device according to claim 1, further comprising
a wind guide portion that is disposed in the roof space and extends along the vehicle ceiling panel to guide air, which flows from the vehicle compartment into the roof space through the communication opening in the desorption operation, to flow along the vehicle ceiling panel.

5. A humidifying device for a vehicle for adsorbing water from air and supplying a humidified air, into a vehicle compartment, the humidifying device comprising:
an adsorption module that holds an adsorbent, the adsorbent adsorbing the water from the air passing through the adsorption module and desorbing the water to air passing through the adsorption module;
a blower; and
a third opening that emits air into a roof space after the adsorbent adsorbs water from the air, the roof space being defined between a vehicle ceiling panel and a ceiling interior member, wherein
the blower, in an adsorption operation in which the adsorbent adsorbs the water from air, is configured to draw the air from the roof space and blow the air to the adsorption module whereby the adsorbent adsorbs the water from the air,
the third opening is located on an opposite side of a blowing outlet that blows the humidified air into the vehicle compartment in a desorption operation in which the adsorbent desorbs the water to the air passing through the adsorption module, and
the blower is located adjacent to the third opening.

6. A humidifying device for a vehicle, located in a roof space, the roof space being defined between a vehicle ceiling panel and a ceiling interior member located inside a vehicle compartment, the humidifying device adsorbing water from air and supplying a humidified air, into the vehicle compartment, the humidifying device comprising:
an adsorption module that holds the adsorbent, the adsorbent adsorbing the water from the air passing through the adsorption module and desorbing the water to air passing through the adsorption module;
a blower; and
a case that houses the adsorption module and the blower and is located in the roof space, wherein
the blower, in an adsorption operation in which the adsorbent adsorbs the water from the air, is configured to
draw air from the roof space into the case through a first opening defined in the case, and
blow the air to the adsorption module whereby the adsorbent adsorbs water from the air;
the first opening has a switching member therein,
the switching member is a switching door that
is rotatably disposed in the first opening,
is configured to guide air to flow into the roof space in the adsorption operation, and
is configured to guide air, after the air passes through the adsorption module, to flow into the vehicle compartment in a desorption operation in which the adsorbent desorbs the water to air passing through the adsorption module.

7. The humidifying device according to claim 6, wherein
the blower, in the adsorption operation, is configured to draw air from the roof space and blow the air into the roof space after the adsorbent adsorbs water from the air, and
the blower, in a desorption operation in which the adsorbent desorbs the water to the air passing through the adsorption module, is configured to draw the air from the roof space and blow the air to the adsorption module.

8. The humidifying device according to claim 6, further comprising
a communication opening defined in the ceiling interior member, the communication opening through which the roof space and the vehicle compartment communicate with each other,
a second opening that is defined in the case, the blower that is configured to draw air from the roof space through the second opening and blow the air to the adsorption module in a desorption operation in which the adsorbent desorbs the water to the air passing through the adsorption module, and
a distance between the communication opening and the second opening is shorter than a distance between the communication opening and the first opening.

9. The humidifying device according to claim 8, wherein the second opening is located between the first opening and the communication opening.

10. The humidifying device according to claim 8, further comprising
a tubular member that is located between the communication opening and the vehicle ceiling panel in the roof space and is distanced from the vehicle ceiling panel.

11. The humidifying device according to claim 10, wherein the tubular member has a wind guide portion that extends from the tubular member toward the case, the wind guide portion being located adjacent to the vehicle ceiling panel and facing the vehicle ceiling panel.

12. The humidifying device according to claim 6, further comprising:
a third opening that blows air into the roof space after the adsorbent adsorbs water from the air in the adsorption operation; and
a blowing outlet that blows the humidified air into the vehicle compartment in a desorption operation in which the adsorbent desorbs the water to the air passing through the adsorption module, wherein
the humidifying device is located between the third opening and the blowing outlet.

13. The humidifying device according to claim 12, wherein a distance between the blower and the third opening is shorter than a distance between the blower and the blowing outlet.

* * * * *